United States Patent
Famolari

(10) Patent No.: US 7,653,023 B2
(45) Date of Patent: Jan. 26, 2010

(54) ASSIGNING CHANNEL ACCESS

(75) Inventor: David Famolari, Stewartsville, NJ (US)

(73) Assignees: Toshiba America Research, Inc., Piscataway, NJ (US); Telcordia Technologies, Inc., Piscataway, NJ (US)

( * ) Notice: Subject to any disclaimer, the term of this patent is extended or adjusted under 35 U.S.C. 154(b) by 625 days.

(21) Appl. No.: 10/934,746

(22) Filed: Sep. 7, 2004

(65) Prior Publication Data
US 2005/0063408 A1  Mar. 24, 2005

Related U.S. Application Data

(60) Provisional application No. 60/500,643, filed on Sep. 8, 2003.

(51) Int. Cl.
*H04W 4/00* (2006.01)

(52) U.S. Cl. .................. 370/329; 370/338; 370/341

(58) Field of Classification Search ............... None
See application file for complete search history.

(56) References Cited

U.S. PATENT DOCUMENTS

| 6,934,752 | B1 * | 8/2005 | Gubbi | 709/225 |
| 7,110,380 | B2 * | 9/2006 | Shvodian | 370/336 |
| 7,272,119 | B2 * | 9/2007 | Rudnick et al. | 370/329 |
| 2002/0061753 | A1 * | 5/2002 | Lysejko et al. | 455/450 |
| 2002/0163928 | A1 * | 11/2002 | Rudnick et al. | 370/444 |

* cited by examiner

*Primary Examiner*—Chi H Pham
*Assistant Examiner*—Soon-Dong D Hyun
(74) *Attorney, Agent, or Firm*—Banner & Witcoff, Ltd

(57) ABSTRACT

A system and method for assigning channel access is described. At least one of a terminal or an access point transmits a message to other entities where the message assigns access to an assignee and includes a duration field of a specified length. The unassigned terminals or access point remain silent for a duration specified in the duration field while the assignee has access to the channel.

34 Claims, 6 Drawing Sheets

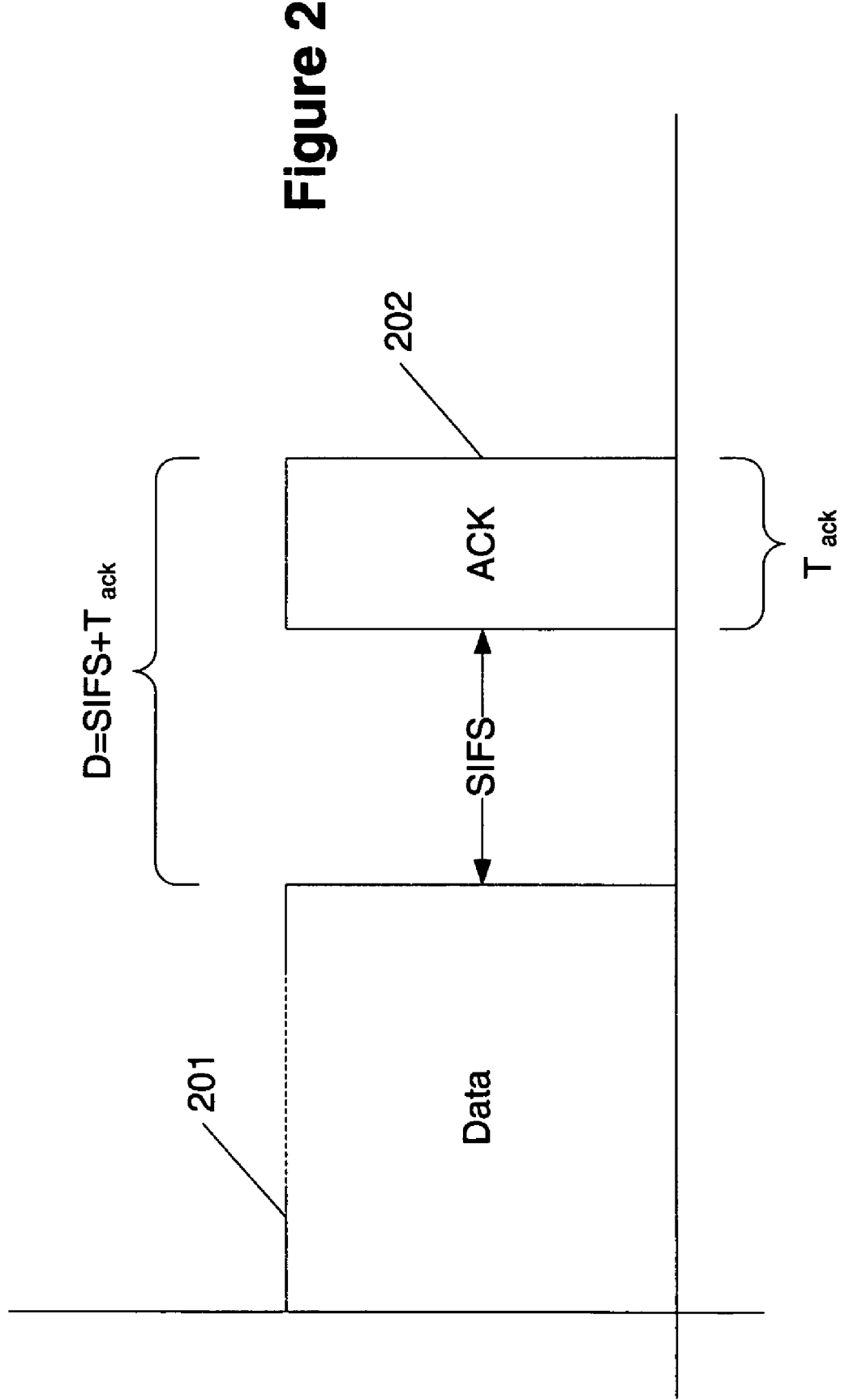

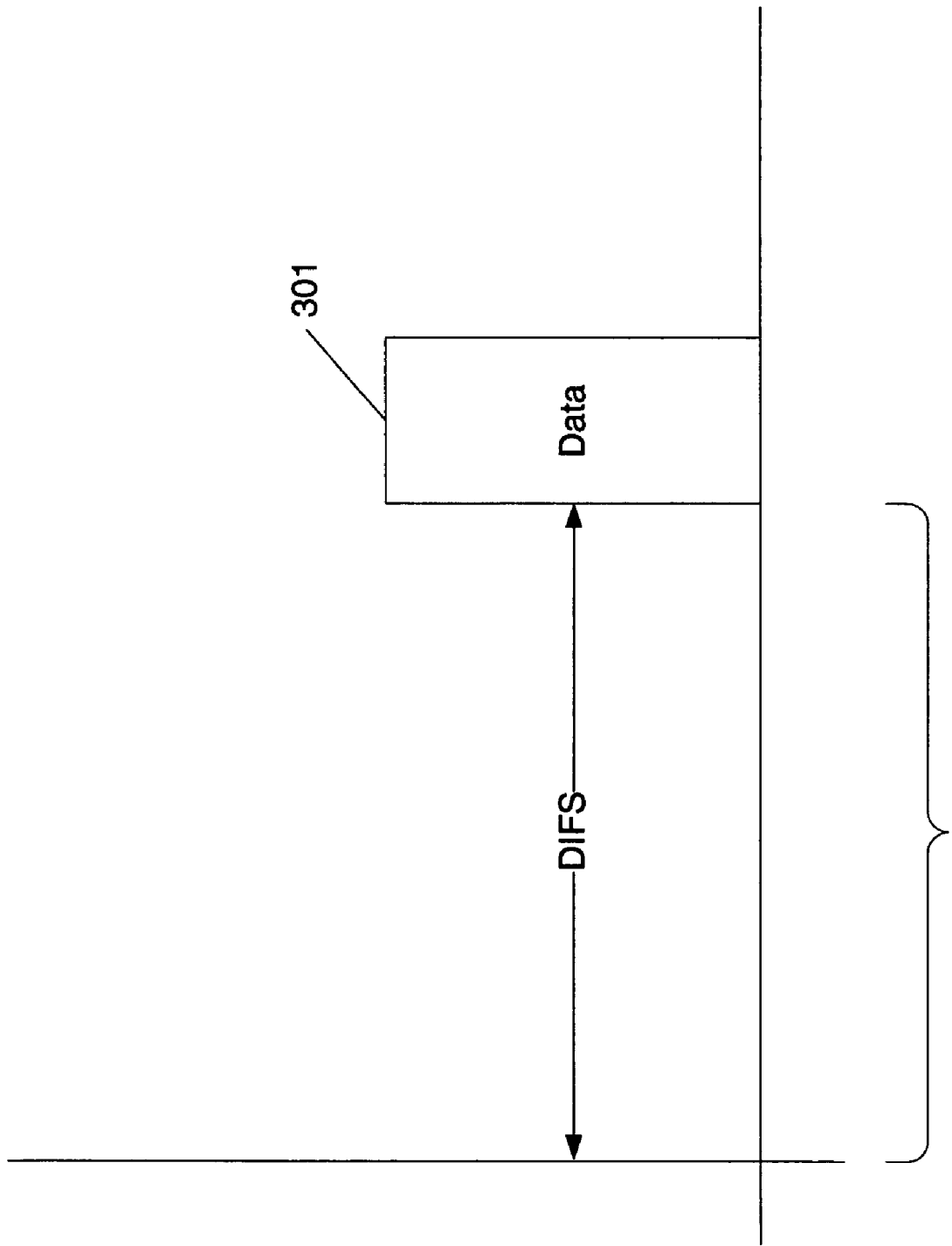

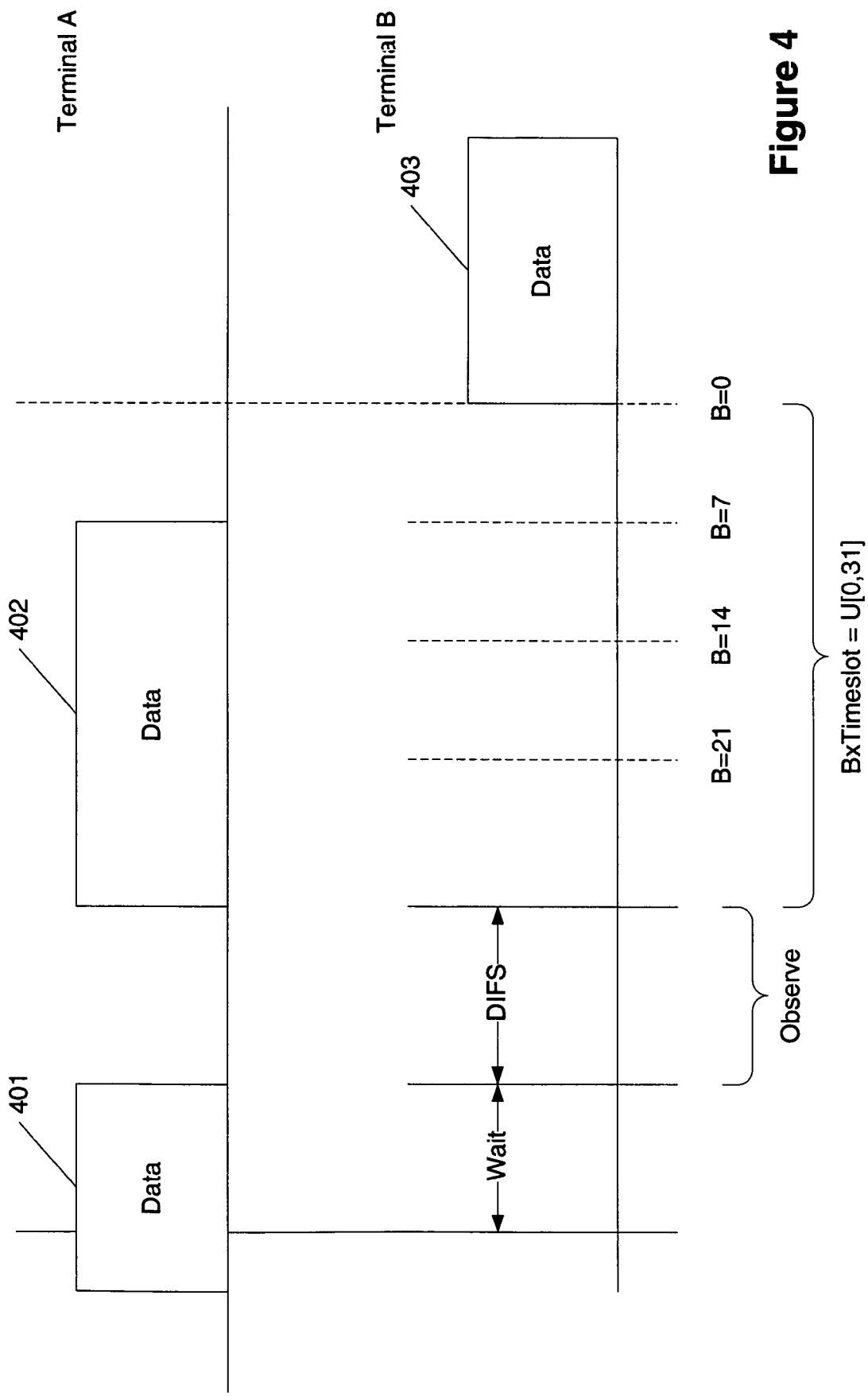

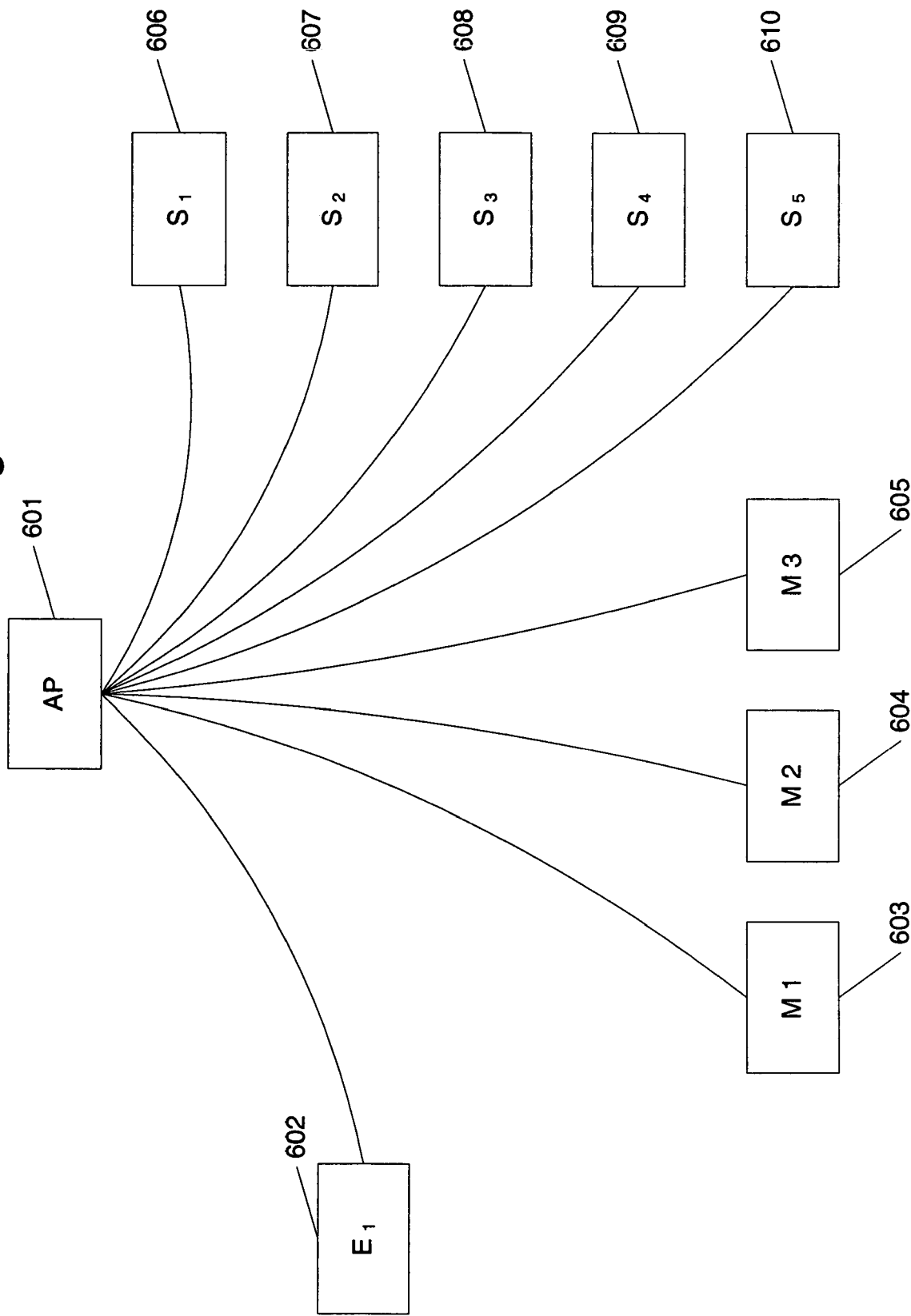

ASSIGNING CHANNEL ACCESS

RELATED APPLICATION INFORMATION

This application claims priority to U.S. Ser. No. 60/500,643, filed Sep. 8, 2003, whose contents are expressly incorporated herein by reference.

BACKGROUND OF THE INVENTION

1. Field of the Invention

Aspects of the present invention relate to communication systems. More particularly, aspects of the present invention relate to controlling access on wireless communication systems.

2. Description of Related Art

Wireless transmission systems are used for both data and voice transmissions. While data transmissions are generally immune to minor delays because of network traffic, voice transmissions are not so immune. Quality of service guarantees (QoS) are often provided to voice users to minimize delays. These guarantees often lead to unnecessary regulation of an access point and minimize the number of users who can use the access point at any given time.

The IEEE 802.11 standard is the most commonly deployed Wireless Local Area Network (WLAN). While 802.11 offers high-speed wireless data access it is not well suited for isochronous services that require bounded delays such as voice, video, and other interactive applications. This problem stems from limitations in the mandatory medium access (MAC) protocol used in 802.11—called the Distributed Coordination Function (DCF). The DCF cannot perform scheduling and has no mechanism to ensure that delays are bounded. Moreover, the DCF is based on a random contention process that is unable to selectively favor individual terminals, i.e. the DCF mode cannot preferentially treat—by granting increased access rights to the medium—one terminal over another. As a consequence, 802.11 DCF terminals cannot be guaranteed contention-free access to the medium and cannot offer bounded delays to isochronous services.

An improvement is needed for handling voice transmissions in wireless networks.

BRIEF SUMMARY

Aspects of the invention address one or more of the issues described above, thereby providing better access capabilities in wireless communication systems.

BRIEF DESCRIPTION OF THE DRAWINGS

The present invention is illustrated by way of example and not limited in the accompanying figures in which like reference numerals indicate similar elements and in which:

FIGS. 2-4 show delay periods associated with transmitting data.

FIGS. 5 and 6 show medium access assignments in accordance with aspects of the present invention.

DETAILED DESCRIPTION

Figure 1B:
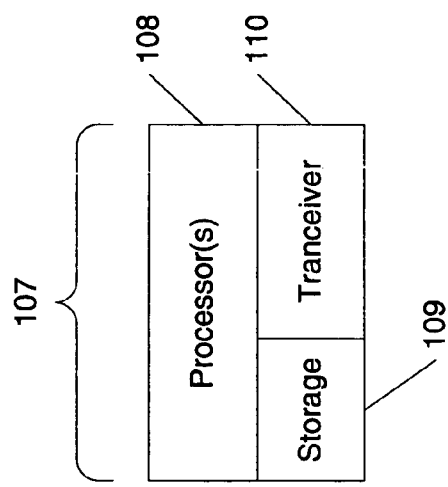
FIGS. 1A and 1B show a block diagrams that may support aspects of the present invention.

Aspects of the invention relate to providing improved throughput for wireless communications. While described with reference to IEEE 802.11 standards, aspects of the invention may be used with other protocols as well.

Aspects of the invention describe methods that enable the DCF to offer such selective, preferential treatment to a selected terminal, including the access point. Furthermore, the invention allows the length, frequency and recipient of this preferential treatment to be tunable which enables the system to essentially schedule transmissions—both uplink and downlink—in a very flexible manner. Aspects of the invention require no changes to client equipment and may be used with standard-compliant off-the-shelf clients. These approaches may not only improve performance for isochronous applications, but may improve performance for delay-tolerant applications as well. Additionally, these approaches can be used as a means to enforce policy decisions regarding medium access. Ensuring that all terminals are granted an equal share of the medium is one example of the kind of policies that can be enforced; granting special, or "priority", terminals an increased share of the medium is another.

Aspects of the invention of describe methods by which an AP may send consecutive packets without waiting for a random deferral period. Moreover, these methods enable consecutive packets addressed to different destinations to be transmitted by the AP while minimizing possible inter-transmission time. This may improve downlink voice performance and increase WLAN voice capacity. Furthermore, aspects of the invention allow the AP to dynamically vary the parameters of the approach is described herein—e.g., the number of consecutive packets, the destination addresses, the frequency of employment, etc.—to meet current operating objectives and performance targets. This adaptive ability makes the approach flexible and applicable to a wide number of situations.

Aspects of the invention may improve performance for isochronous applications, and they be used to improve performance for delay-tolerant applications as well. Additionally, aspects of the invention can be used as a means to enforce policy decisions regarding downlink medium access. Ensuring that all downlink flows are granted an equal share of the medium is one example of the kind of policies that can be enforced. Granting special, or "priority", flows an increased share of the medium is just one of the other policies that may be enforced as well.

The following description is organized into headings as follows: terms; wireless communications; IEEE 802.11; DCF operation; carrier sensing; packet transmissions; detection of duration/ID field; operation of the NAV; and access control.

It is noted that various connections are set forth between elements in the following description. It is noted that these connections in general and, unless specified otherwise, may be direct or indirect and that this specification is not intended to be limiting in this respect.

Terms

AP—Access Point

PHY—Phyiscal Layer

LLC—Logical Link Control

MAC—Medium Access Control

DCF—Distributed Coordination Function

CSMA/CA—Carrier Sensing Multiple Access with Collision Avoidance

DIFS—Distributed Inter-Frame Space

SIFS—Short Inter-Frame Space

EIFS—Extended Inter-Frame Space

CW—Contention Window

RTS—Request to send

CTS—Clear to send

ACK—acknowledgment

NAV—Network Allocation Vector

Wireless Communications

WLANs, like most communications systems, employ a layered approach where certain network functions are contained in certain layers. Each layer is responsible for faithfully executing its responsibilities and communicating with other layers through standard defined interfaces. The layering approach hides the implementation of the functionality from other layers. This effectively separates functionality from implementation, allowing manufacturers to develop innovative implementations that achieve standards-required functionality and that easily integrated with other layers. By using standard interfaces, designers can build layer functionality that is independent of functionality at other layers, improving interoperability and development.

Figure 1A:
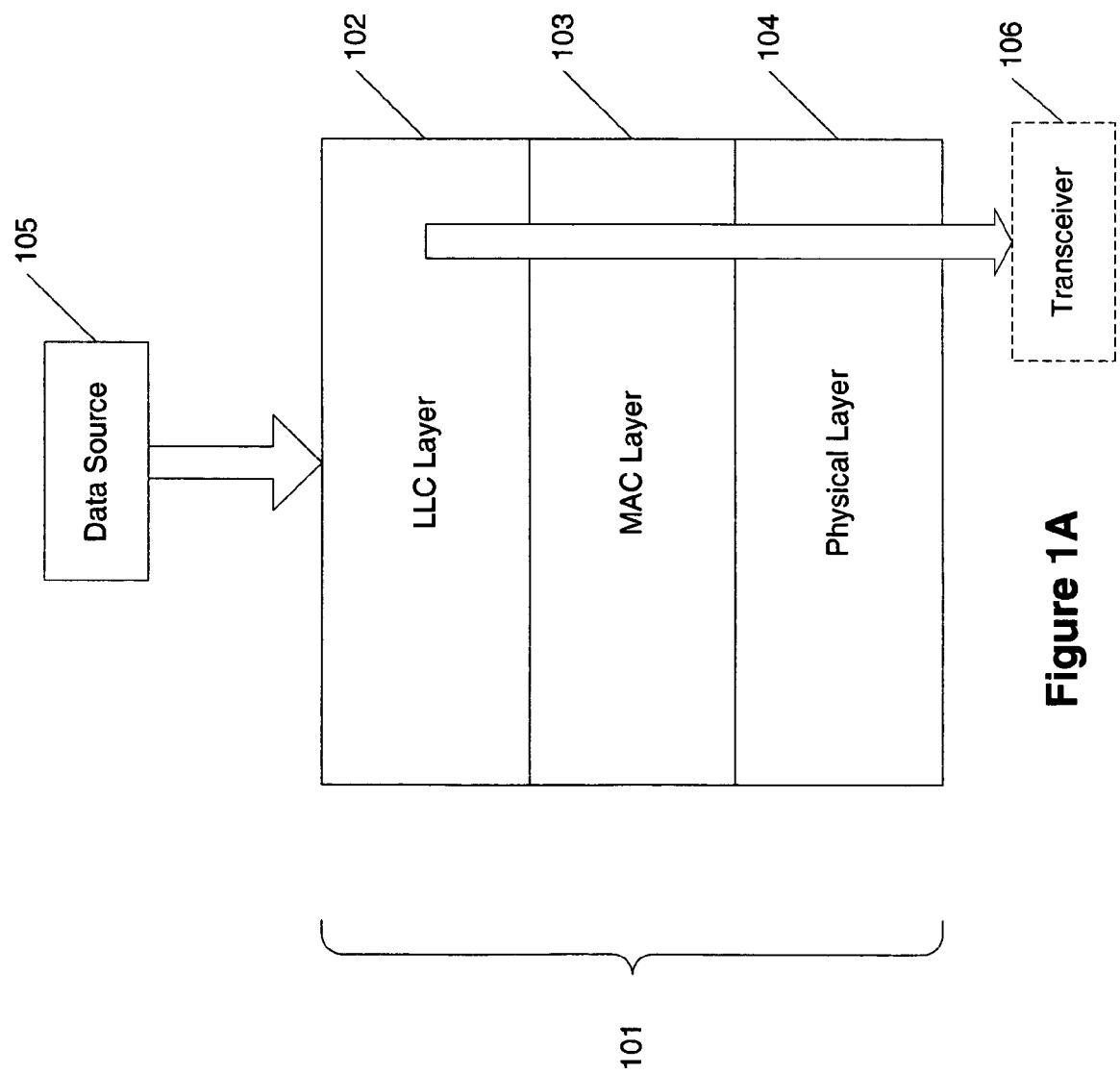

FIG. 1A shows an example of three layers in an access point AP 101. Logical Link Control (LLC) layer 102 delivers data information from data source 105 to Medium Access Control (MAC) layer 103. MAC layer 103 modifies and forwards the data information to physical (PHY) layer 104, where physical layer 104 then forwards the data information to a transceiver 106. To more readily appreciate the invention, aspects of the IEEE 802.11 standard are described in detail. It is appreciated that the layers of access point 101 may also be found in a mobile terminal.

FIG. 1B the shows a hardware description of an access point or mobile terminal 107. It may include a processor (or processors) 108, storage 109, and transceiver 110. These elements may work in conjunction to support the various aspects of the present invention.

IEEE 802.11

The IEEE 802.11 standard defines and specifies the behaviors of two layers: the Physical (PHY) layer 104 and the MAC layer 103. The former deals with all the baseband and radio operations that enable 802.11 stations to produce, detect, and interpret radiated energy; allowing a 'channel' to be formed by which data signals can be exchanged. The latter deals with regulating each terminal's access to this channel. The third layer, the Logical Link Control (LLC) layer 102, is also discussed in the 802.11 standard. This layer delivers data information to the MAC layer 103 for transmission and receives data form the MAC layer 103 indicating the fate (success/failure) of such transmissions. These three layers are organized on top of each other with the LLC 102 resting on top of the MAC 103, resting on top of the PHY 104.

The IEEE 802.11 standard, when implemented in communications systems, moves information between LLC 102 layers on different machines. To accomplish this goal, the 802.11 standard does not define the behavior of the LLC layer itself, as it does for the MAC and PHY layers, but rather defines a set of interfaces between the LLC and MAC layers. These interfaces ensure that information is exchanged between these two layers in a consistent and standard fashion.

DCF Operation:

A station that wishes to initiate a transmission must first ensure that its carrier sensing mechanism reports an idle medium for a period of time referred to as a Distributed Inter-Frame Space (DIFS). If during this DIFS period the carrier sensing mechanism reports a busy medium the station will enter a random backoff mode. At this point, it will randomly select a backoff timer from a uniform distribution from a Contention Window (CW) beginning at 0 and ending at a specified maximum value called CWmax. The selected number, called the backoff timer, represents an integer number of 10-microsecond timeslots. In addition to the DIFS interval, the station must further observe an idle medium for the duration of the backoff timer before it can begin transmission. After observing an idle medium for a DIFS duration, the station will begin to decrement the backoff timer; the backoff timer decrements once for each timeslot where its carrier sensing mechanism reports an idle medium. If at any time during this period the station's carrier sensing mechanism reports a busy medium, the countdown will be suspended until an idle medium is detected for a DIFS duration, at which point the countdown will resume. Once the backoff timer has reached a value of 0 the station may commence transmission.

The receiving station will generate an acknowledgement packet upon correctly decoding the transmitted packet. The receiving station will transmit this acknowledgement according to the DCF operating rules described above, but with one exception. Stations transmitting acknowledgements are not required to wait for a DIFS period; instead they are only required to wait a small fraction of that time—called a Short Inter-Frame Space (SIFS)—before transmitting. By using a SIFS that is significantly smaller than a DIFS, the 802.11 standard ensures that acknowledgements face no medium access contention and can be quickly transmitted.

FIG. 2 shows an example where data 201 is followed by an acknowledgment 202. Between the end of data 201 and the beginning of acknowledgment 202 is the SIFS period. The time consumed by acknowledgment 202 is represented as time $T_{ack}$. The delay D experienced by the entity trying to transmit data 201 between data packets may be represented as $D=SIFS+T_{ack}$.

If a transmitting station does not receive a positive acknowledgement of its transmission, it will re-enter the backoff mode. However, in this case, the Contention Window will double and all waiting periods requiring a DIFS value in the original backoff mode will now require an Extended Inter-Frame Space (EIFS) value which may be 7 times as long as a DIFS. FIG. 3 shows back off period DIFS followed by the transmission of data 301.

Medium access delays are unbounded because the backoff mode can be interrupted indefinitely by competing stations' transmissions. This is a problem in supporting isochronous applications in the DCF mode. Also, the carrier sensing mechanism plays an important role in the MAC protocol—controlling when and if the backoff mode is entered, and when the backoff timer is stopped and started.

If the transmitting station does receive a positive acknowledgement, it will again enter a backoff stage—called post-transmission backoff. The transmitting station enters into post-transmission backoff regardless of whether or not it has another packet to transmit. By making all stations enter a post-transmission backoff stage, the standard ensures that a station always separates consecutive packet transmissions by at least one backoff stage.

FIG. 4 shows terminal A transmitting data and terminal B waiting to transmit data. Terminal A transmits data 401 followed by a DIFS interval then data 402. Terminal B waits while terminal A transmits data 401. Terminal B then observes the carrier during the DIFS interval. Noting data 402 appearing in the medium, terminal B next enters a back off phase. Here, for instance, the back off interval is 32 cycles. A timer is started at the end of the DIFS period and counts for the number of cycles. At this point, terminal B begins to transmit data 403.

Carrier Sensing:

IEEE 802.11 implements carrier sensing in two fashions: virtual and physical. Physical carrier sensing detects radiated energy on the wireless medium to determine activity. Virtual carrier sensing uses information carried in the headers of transmitted packets to learn the expected time that the medium will remain busy. This estimate is carried in the Duration/ID field of transmitted packets and is constructed by the sending station. Stations use the duration information to construct a Network Allocation Vector (NAV)—a counter that represents the time the medium is expected to be busy. The NAV value represents an integer number of microseconds and is decremented once after every microsecond. Only when the NAV value is zero will the virtual carrier sensing mechanism report an idle medium.

Both the virtual and carrier sensing mechanisms must report an idle medium before the station will consider the medium idle. In other words, if either the physical or the virtual carrier sensing mechanisms reports a busy medium, the station will not attempt to transmit.

Packet Transmissions:

The IEEE 802.11 standard defines two methods for completing a packet cycle. A packet cycle begins with an attempt to transmit a data (DATA) packet and concludes with the receipt of the corresponding acknowledgement (ACK) packet. The first method, referred to here as the 2-way method, begins with the transmitting station sensing the medium, entering backoff mode if appropriate, and transmitting the data packet as per the DCF operation rules described above. The receiving station, upon receipt of the packet, will generate and transmit an acknowledgement packet after waiting a SIFS period of time. Thus the 2-way method progresses as: DATA-ACK.

The second method involves a 4-way handshaking technique. In this 4-way technique, the intent to transmit a data packet is first announced by transmitting a small Request-To-Send (RTS) packet—according to the DCF operating rules—to the intended recipient. Upon receipt of this RTS packet, the intended recipient will transmit a Clear-To-Send (CTS) packet back to the sender after waiting a SIFS period. Once the sender receives the CTS packet, it has the go-ahead to immediately transmit the DATA packet following another SIFS period. The recipient will acknowledge the proper receipt of the DATA packet by transmitting an ACK packet. Thus, the 4-way handshake is: RTS-CTS-DATA-ACK. The 4-way technique can be more efficient than the 2-way technique for large packets in heavily loaded networks because the terminals contend only with small RTS packets, rather than large DATA packets. Thus, the effects of collisions are reduced.

Calculating the Duration/ID Field:

Virtual carrier sensing, as implemented by the standard, is handled differently for the 2-way and the 4-way packet transmission techniques. The Duration/ID field carried in RTS/CTS packets is calculated differently than that carried in DATA packets. In DATA packets the Duration/ID field is computed as follows (from ANSI/IEEE Std. 802.11 1999 Edition, Section 7.2.2, page 45):

If the Address 1 field contains a group address, the duration value is set to 0.

If the More Fragments bit is set to 0 in the Frame Control field of a frame and the Address 1 field contains an individual address, the duration value is set to the time, in microseconds, required to transmit one ACK frame, plus one SIFS interval.

If the More Fragments bit is set to 1 in the Frame Control field of a frame, and the Address 1 field contains an individual address, the duration value is set to the time, in microseconds, required to transmit the next fragment of this data frame, plus two ACK frames, plus three SIFS intervals.

The Frame Control field is a field within the MAC header of all transmitted packets. The More Fragments bit indicates whether or not this transmission is part of a number of fragments that represent a large, single higher-layer packet. Address 1 refers to the intended recipient of the packet. Without loss of generality, the following focuses on cases where the Address 1 is an individual address and the More Fragments bit is set to 0. In this case packets are sent to individual terminals—either an 802.11 client or the Access Point (AP)—and they are not fragmented.

For RTS packets, the standard computes the Duration/ID fields as follows. "The duration value is the time, in microseconds, required to transmit the pending data or management frame, plus one CTS frame, plus one ACK frame, plus three SIFS intervals. If the calculated duration includes a fractional microsecond, that value is rounded up to the next higher integer."

For CTS packets the Duration/ID field is the "value obtained from the Duration field of the immediately previous RTS frame, minus the time, in microseconds, required to transmit the CTS frame and its SIFS interval. If the calculated duration includes a fractional microsecond, that value is rounded up to the next higher integer."

The Duration/ID field is a 15-bit integer whose values range from 0 to 32,768. However, the maximum value of 32,678 is reserved in the standard. Therefore the maximum Duration/ID value that can be used to influence stations' NAVs is 32,767. This value translates into 0.032767 seconds.

Operation of the NAV

As stated above, the Network Allocation Vector (NAV) is an integer counter—whose value is determined by the Duration/ID fields of received packets—that decrements once each microsecond and determines the state of the virtual carrier sensing mechanism. The Duration/ID field in received packets is used to update the Network Allocation Vector (NAV). In general, the NAV value is simply the Duration/ID field. However, not all Duration/ID fields will lead to new NAVs; only under certain conditions—specified in the standard—will the NAV value be updated. There are two mandatory NAV updating rules. These rules are taken from Section 9.2.5.4 of the Standard and state that the NAV will only be updated if:

a. The new NAV value is larger than the old NAV value, and;

b. The packet containing the Duration/ID field is not addressed to the receiving station.

Both these conditions must be met before the NAV value will be updated. This means that a station will never update its NAV with a Duration/ID field from a packet that is address to it, but all other stations will consider this value. Secondly, this means that detecting a smaller NAV value will have no effect on the current NAV value. These are two concepts that ensure only the passing of time can make the NAV the value smaller.

The only exceptions to the two rules above deal with the 4-way packet transmission process. If a station has set a NAV value using information contained in an RTS packet it can reset its NAV value to zero if it does not receive a PHY-RXSTART.indication from its physical interface during a period equal to (2×aSIFSTime)+(CTS_Time)+(2×aSlot-Time) starting at the PHY-RXEND.indication corresponding to the detection of the RTS frame. Simply put, the station will reset a NAV set by an RTS frame if it does not receive a corresponding CTS packet within a prescribed time. The time value for current IEEE 802.11 Direct Spread Spectrum Systems (DSSS) is equal to 10 μs+14*8 μs+2*20 μs=162 μs.

Once a station has set a NAV value using information contained in any packet other than a RTS packet, or has received a corresponding CTS packet, the NAV value can only be decreased by the passing of time. That is, once this NAV has been set, that station's virtual carrier sensing mechanism will never report an idle medium before the amount of time specified by the NAV value. Since transmission in the DCF mode requires that BOTH the physical and the virtual carrier sensing mechanisms report idle mediums, the station defers for an amount of time not less than its current NAV value. This fact, along with the fact that a station does not update its own NAV value with a Duration/Id field received in a packet that is addressed to it, combine to help accomplish the desired system performance.

Access Control

Current WLAN systems are not well suited to support isochronous services such as voice that have strict requirements on delay and jitter. This is because the DCF MAC protocol implements a backoff procedure that is random, offers no guarantee of access and can cause unbounded delays. The conventional 802.11 MAC protocol introduces excessive delays that degrade the performance of isochronous services. Additionally, in AP environments, where a collection of mobile stations communicate via an AP, the AP is often contending for the medium on behalf of multiple data sessions and consequently, will be carrying a greater load than individual stations. However, the 802.11 MAC protocol affords no special privileges to the AP and it achieves the same degree of medium access as individual stations despite the increased load. The following describes a method in which an IEEE 802.11 station an AP or terminal that can assign other stations a specified time where they are guaranteed to have contention-free medium access. This may allow them to send consecutive data packets without interruption, schedule delay-sensitive data, clear buffer space before packets are dropped and improve performance. For simplicity, aspects of the present invention are described in relation to an access point AP. However, it is appreciated that mobile terminals may also be presented with the capability to assign and grant access rights for a limited period of time.

Aspects of the invention describe various approaches in which an AP can use the Duration/ID fields to "assign" the channel to a particular terminal, or to itself, and achieve contention-less access to the medium for a specified period of time. This type of capture may be used to perform "soft"-scheduling where the AP (or designated terminal) can provide this special access periodically to a subset of terminals based on application needs or policy decisions.

Access may be assigned to an access point or a terminal. The assigning entity may be an access point or terminal. The basis of the assignment may be based on a request from an access point or terminal, congestion of the network, capacity of the network, the type of data to be or being transmitted, a combination of these reasons or additional/alternative reasons.

Figure 5:
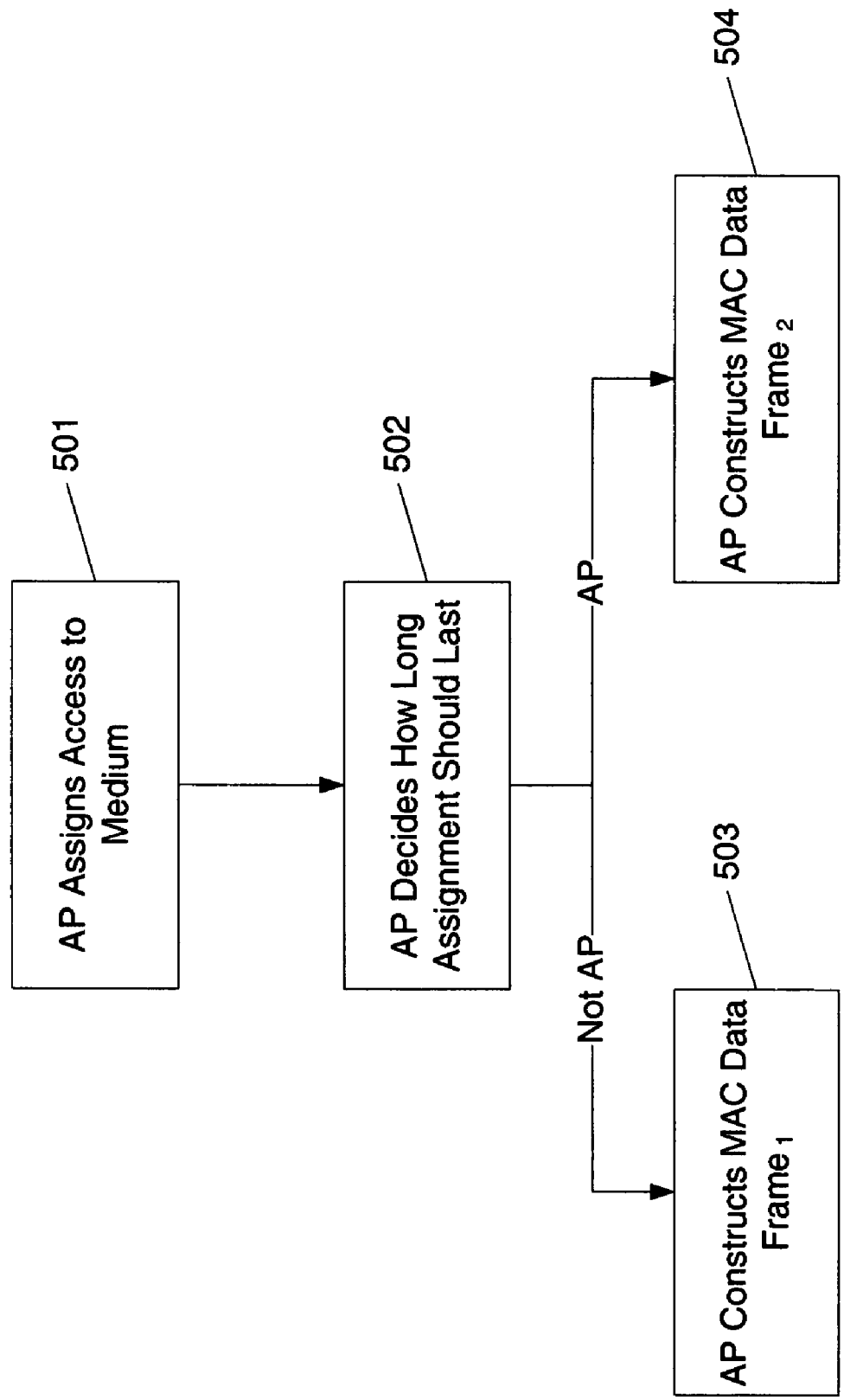

FIG. 5 shows various steps with relation to aspects of the present invention. In step 501, an AP decides to assign the medium to a particular terminal, or to itself. The station to which the medium has been assigned is referred to as the Assignee.

In step 502, the AP decides how long this assignment should last. The possible values range from 0 to 0.032767 seconds. The assignment may or may not be based on a predefined value (for instance, 1-1000 ms) or and exchange of information with the Assignee to determine how much information or the priority of the information patents to be transmitted. The time the assignment lasts is referred to as the Capture time.

In step 503, Assignee is not the AP. Here, the AP may then construct a MAC DATA flame (called the Assigning flame, or Assigning packet) according to the normal operating procedures put forth in the 802.11 standard with the following exceptions. The packet header may have the following fields in the MAC header:

1. Protocol Version (bits 1 and 0) of the Frame Control field may be set to 00. This indicates that the frame is a standard 802.11 frame.
2. The Type field (bits 3 and 2) of the Frame Control field may be set to 10 indicating a DATA frame.
3. The Sub-type field (bits 7, 6, 5 and 4) of the Frame Control field may be set to 0000 indicating a normal Data frame.
4. The Duration/ID field may have bits 14 through 0 set to the number indicating the number of microseconds that the Capture time will last.
5. The Duration/ID field may have bit 15 set 0.
6. The RA field of the MAC header (Address1) may be set to the 48-bit MAC address of the Assignee.
7. The SA field of the MAC header (Address2) may be set to the 48-bit MAC address of the AP.

The AP may then update the NAV value to reflect the Capture time.

As shown in step 504, the AP may alternatively be the Assignee. Here, The AP may construct a MAC DATA packet according to the normal operating procedures put forth in the 802.11 standard with the following exceptions. The packet header may have the following fields in the MAC header:

1. Protocol Version (bits 1 and 0) of the Frame Control field may be set to 00. This indicates that the frame is a standard 802.11 frame.
2. The Type field (bits 3 and 2) of the Frame Control field may be set to 10 indicating a DATA frame.
3. The Sub-type field (bits 7, 6, 5 and 4) of the Frame Control field may be set to 0000 indicating a normal Data frame.
4. The Duration/ID field may have bit 15 set 0.
5. The Duration/ID field may have bits 14 through 0 set to the number indicating the number of microseconds that the Capture time will last.
6. The RA field of the MAC header (Address1) may be a 48-bit field where the first bit is set to 0 and the remaining bits are set to 1. The first bit in a standard MAC addresses corresponds to the Individual/Group field. When this bit is set to 0 it indicates that what follows is a single, individual MAC address.
7. The SA field of the MAC header (Address2) may be the set to the 48-bit MAC address of the AP.

It is appreciated that the above specification of bit lengths is dependent on the protocol used. For instance, the use of a different protocol may specify different bit lengths to be used in accordance with aspects of the invention.

This procedure as shown in FIG. 5 ensures that the Assignee may enjoy contention-free access to the medium for the determined Capture time. The procedure is explained in further detail below.

First, in step 503, the AP may not be the Assignee. In this case the AP has identified a target station—and that target station's 48-bit MAC address—that will be the Assignee. By virtue of the fact that all stations associated with an AP must, by definition, be able to hear transmission from the AP, all associated stations will receive the Assigning frame. Because of the NAV updating rules described above—in particular that a station will not update its NAV value with a Duration/ID field received in a packet address to it—the Assignee will not consider the Duration/ID field of the Assigning packet for its NAV. However, all other stations will consider this value and, after reception, will necessarily have NAV values either equal to, or greater than, the Duration/ID field of the Assigning Packet—if a station has a lower NAV value than this field, it will update it; otherwise it must have a larger NAV value. After sending the Assigning packet the AP will update its own NAV value to that of the Capture time.

After the assigning process—after the Assigning packet has been received by all stations and the AP has updated its own NAV—a situation may exist where everyone has a NAV value greater than or equal to the Capture time, except for the Assignee. The Assignee may then have whatever NAV value it had previous to the assigning process decremented by the length of the assigning process. Next, due to the DCF operating rules described above—particularly that CSMA/CA will report a busy medium whenever the NAV is greater than 0 and that a station will never attempt to transmit when the medium is busy—no other station, except the Assignee, can attempt to access the medium during the Capture time.

With respect to step 504, the process for when the AP is the Assignee is similar. In this situation, the AP issues an Assigning packet with a bogus individual MAC address that may not be valid for any station in the network. The Individual/Group bit is set to 0 to indicate that the packet is directed to an individual station because the stations will not use Group directed packets to update their NAV values. In the AP-Assignee case, the AP does not set its own NAV because that would prevent it from accessing the medium.

It should be noted that a new station, not present at the beginning of the current assigning process may become active in the middle of the capture time. The AP is always aware of such stations because they must formally associate with the AP. In this case the AP may or may not issue this station an Assignee packet as detailed above with the Duration/ID field set to the time remaining in the current Capture period.

It should be remarked that this assigning process does not guarantee that the Assignee will be successful in accessing the medium or even that it will have packets to send. It merely provides more favorable operating conditions to selected stations in an as-needed basis. It should also be remarked that the choice of Capture time will affect performance. Values that are too high will unnecessarily block stations from the medium and produce poor performance.

Aspects of the invention may be used to perform scheduling in 802.11 DCF networks. One form of scheduling could call for the periodic assignment of the medium to a list of stations in a round-robin fashion. This would be most akin to "hard" scheduling that is done in time-slotted systems. Another form of scheduling could isolate "preferred" terminals and periodically assign the medium to them. This type of scheduling enables preferential treatment for terminals. Application requirements, class-of service definitions, or any other distinguishing factor could serve as the basis for classifying terminals as "preferred".

Aspects of the invention may be used to perform once-in-a-while relief to over-burdened terminals. If such a terminal is identified, the AP can assign it the medium for a brief period of time so that it may more quickly empty its queue of backlogged traffic. Equally the AP could decide that is experiencing excessive queue buildup and decide to assign the channel to itself in order to avoid dropping packets and deteriorating performance.

An illustrative variation of this utility can be thought of in the military context. Consider a set of important, time-relevant commands such as firing instructions, etc., that must be sent in a specified period of time. Aspects of the invention allow that terminal sending this command to be assigned the medium for the necessary time, regardless of the level of activity. This long set of commands—that may have required hundreds of packets to send and thus hundreds of medium access attempts—can now be delivered contention-free. The delay in getting the message across is only equal to the delay in accessing the medium for the initial delivery of the single Assigning packet, as opposed to the hundreds of such delays that would have been encountered had the individual packets stream been transmitted in the standard fashion.

As shown in FIG. 6, a further illustrative example may occur in a corporate setting in which top executives and officers (E) 60 to need to have access to the medium essentially on demand as provided by access point 601. Similarly, managers and other leadership personnel (M) 603-605 may need access to the medium fairly quickly, but not to the on demand extent of the officers and top executives. Finally, generic employees or staff (S) 606-610 may only need the medium when it is not being used by the top executives and officers or the managers.

Aspects of the invention may be coupled with real-time packet monitoring to produce assignment decisions that adjust to current traffic conditions. For example, the AP may decide to assign the medium to a terminal that is experiencing high packet-error rates, that is making frequent retransmissions, or that is experiencing weak signal strengths, among numerous other factors.

The duration of the assignment can also be varied according to real-time traffic conditions and application requirements. For example, the capture time can be set to a value that is consistent with voice coded packetization rates. Voice applications generally generate small packets on the order of every 10, 20, 30 or 40 milliseconds; the AP may assign correspondingly small capture times that would be sufficient to transmit a single voice packet. Owing to the maximum contention time defined by the 802.11 standard, a terminal, once assigned, would never require more time than 670 microseconds before an initial transmission. Therefore, a capture time of 670 microseconds plus the transmission time of a single voice packet would suffice to guarantee an assigned terminal at least one medium access attempt. Capture times for other application types—particularly those that have isochronous requirements and fixed packet sizes such as video, etc.—could be calculated in a similar fashion.

A number of other applications of aspects of the invention are possible and the above list is illustrative and by no means exhaustive. The present invention has been described in terms of preferred and exemplary embodiments thereof. Numerous other embodiments, modifications and variations within the scope and spirit of the appended claims will occur to persons of ordinary skill in the art from a review of this disclosure. The invention further provides computer-readable medium storing a computer executable program to process the methods

I claim:

1. A method for providing access to a channel to at least one of a plurality of terminals and an access point comprising:
   determining if the channel is to be assigned for a limited time to said at least one of said plurality of terminals and said access point;
   determining how long said assignment is to last; and
   assigning said channel to said at least one of said plurality of terminals and said access point via constructing a Medium Access Control (MAC) data frame including a duration field and then transmitting said MAC data frame to at least one of said plurality of terminals and said access point.

2. The method according to claim 1, wherein said channel uses an IEEE 802.11 protocol.

3. The method according to claim 1, wherein said access point assigns said channel.

4. The method according to claim 1, wherein a terminal assigns said channel.

5. The method according to claim 1, wherein said access point is assigned said channel.

6. The method according to claim 1, wherein a terminal is assigned said channel.

7. The method according to claim 1, wherein said determining step that determines if said channel is to be assigned makes said determination based on a request.

8. The method according to claim 1, wherein said determining step that determines if said channel is to be assigned makes said determination based on network capacity.

9. The method according to claim 1, wherein said determining step that determines if said channel is to be assigned makes said determination based on network congestion.

10. The method according to claim 1, wherein said determining step that determines if said channel is to be assigned makes said determination based a type of data to be transmitted.

11. The method according to claim 1, wherein said determining step that determines how long said assignment is to last is based on a request.

12. The method according to claim 1, wherein said determining step that determines how long said assignment is to last is based on network capacity.

13. The method according to claim 1, wherein said determining step that determines how long said assignment is to last is based on network congestion.

14. The method according to claim 1, wherein said determining step that determines how long said assignment is to last is based on a type of data to be transmitted.

15. A computer-readable medium having a program stored thereon, said program for providing access to a channel to at least one of a plurality of terminals and an access point, said program comprising:
   determining if the channel is to be assigned for a limited time to said at least one of said plurality of terminals and said access point;
   determining how long said assignment is to last; and
   assigning said channel to said at least one of said plurality of terminals and said access point via constructing a Medium Access Control (MAC) data frame including a duration field and then transmitting said M AC data frame to at least one of said plurality of terminals and said access point.

16. The computer-readable medium according to claim 15, wherein said channel uses an IEEE 802.11 protocol.

17. The method according to claim 15, wherein said access point assigns said channel.

18. The computer-readable medium according to claim 15, wherein a terminal assigns said channel.

19. The computer-readable medium according to claim 15, wherein said access point is assigned said channel.

20. The computer-readable medium according to claim 15, wherein a terminal is assigned said channel.

21. The computer-readable medium according to claim 15, wherein said determining step that determines if said channel is to be assigned makes said determination based on a request.

22. The computer-readable medium according to claim 15, wherein said determining step that determines if said channel is to be assigned makes said determination based on network capacity.

23. The computer-readable medium according to claim 15, wherein said determining step that determines if said channel is to be assigned makes said determination based on network congestion.

24. The computer-readable medium according to claim 15, wherein said determining step that determines if said channel is to be assigned makes said determination based a type of data to be transmitted.

25. The computer-readable medium according to claim 15, wherein said determining step that determines how long said assignment is to last is based on a request.

26. The computer-readable medium according to claim 15, wherein said determining step that determines how long said assignment is to last is based on network capacity.

27. The computer-readable medium according to claim 15, wherein said determining step that determines how long said assignment is to last is based on network congestion.

28. The computer-readable medium according to claim 15, wherein said determining step that determines how long said assignment is to last is based on a type of data to be transmitted.

29. A process for assigning channel access to at least one of a plurality of terminals and an access point, said process comprising the steps of:
   constructing a Medium Access Control (MAC) data frame including a duration field; and
   transmitting said MAC data frame to at least one of said plurality of terminals and said access point,
   wherein the assigned terminal or access point has access to said channel for a period specified in said duration field and wherein non-assigned terminals or access point does not have access to said channel for the period specified in said duration field.

30. A device for assigning access to a channel comprising:
   at least one processor that controls a Logical Link Control (LLC) layer and a Medium Access Control (MAC) layer, wherein said processor creates a message that assigns channel access to an assignee; and
   a transceiver for transmitting said message to at least one of a plurality of terminals and an access point,
   wherein said message includes a duration field that specifies the duration non-assigned terminals or access point is to permit access to said channel by said assignee.

31. The device according to claim 30, wherein said device is a second access point.

32. The device according to claim 30, wherein said device is a terminal.

33. The device according to claim 30, wherein said assignee is an access point.

34. The device according to claim 30, wherein said assignee is a terminal.

* * * * *

UNITED STATES PATENT AND TRADEMARK OFFICE
CERTIFICATE OF CORRECTION

PATENT NO. : 7,653,023 B2
APPLICATION NO. : 10/934746
DATED : January 26, 2010
INVENTOR(S) : David Famolari It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1233 days.

Signed and Sealed this

Twenty-third Day of November, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,653,023 B2 |
| APPLICATION NO. | : 10/934746 |
| DATED | : January 26, 2010 |
| INVENTOR(S) | : Famolari |

Page 1 of 1

It is certified that error appears in the above-identified patent and that said Letters Patent is hereby corrected as shown below:

In the Drawings

In Fig. 1B, Sheet 1 of 6, for Tag "110", delete "Tranceiver" and insert -- Transceiver --, therefor.

In the Specification

In Column 2, Line 55, delete "Phyiscal" and insert -- Physical --, therefor.

In Column 3, Line 32, delete "FIG. 1B the shows" and insert -- FIG. 1B shows --, therefor.

In Column 3, Line 49, delete "form" and insert -- from --, therefor.

In Column 8, Line 7, delete "or and" and insert -- and/or --, therefor.

In Column 8, Line 13, delete "flame (called the Assigning flame," and insert -- frame (called the Assigning frame, --, therefor.

In Column 10, Line 67, delete "methods" and insert -- methods". --, therefor.

In the Claims

In Column 11, Line 35, in Claim 10, delete "based a" and insert -- based on a --, therefor.

In Column 11, Line 60, in Claim 15, delete "M AC" and insert -- MAC --, therefor.

In Column 11, Line 65, in Claim 17, delete "The method" and insert -- The computer-readable medium --, therefor.

In Column 12, Line 20, in Claim 24, delete "based a" and insert -- based on a --, therefor.

Signed and Sealed this
Sixth Day of January, 2015

Michelle K. Lee
*Deputy Director of the United States Patent and Trademark Office*